June 16, 1931. R. P. HARVEY 1,809,897
DEFLATING DEVICE
Filed March 29, 1930

INVENTOR.

Patented June 16, 1931

1,809,897

UNITED STATES PATENT OFFICE

ROBERT P. HARVEY, OF LONGMEADOW, MASSACHUSETTS, ASSIGNOR TO THE FISK RUBBER COMPANY, OF CHICOPEE FALLS, MASSACHUSETTS, A CORPORATION OF MASSACHUSETTS

DEFLATING DEVICE

Application filed March 29, 1930. Serial No. 440,133.

This invention relates to a device for deflating pneumatic tubes such as the inner tubes used in pneumatic tires. Such tubes are provided with valves normally holding the air in the tubes.

It is customary during the manufacture of such tubes to inflate or partially inflate the tubes for test or inspection and it is necessary to thereafter deflate the tubes to permit wrapping or packaging or other operations. Various devices have been proposed for rapidly withdrawing the air from the tubes and it is the object of my invention to provide an improved device of this character which shall be simple in construction and operation and to secure economies in initial cost and maintenance.

In the accompanying drawings which illustrate one embodiment of my invention,

Figures 1, 2, 3, 4, 5, 6:
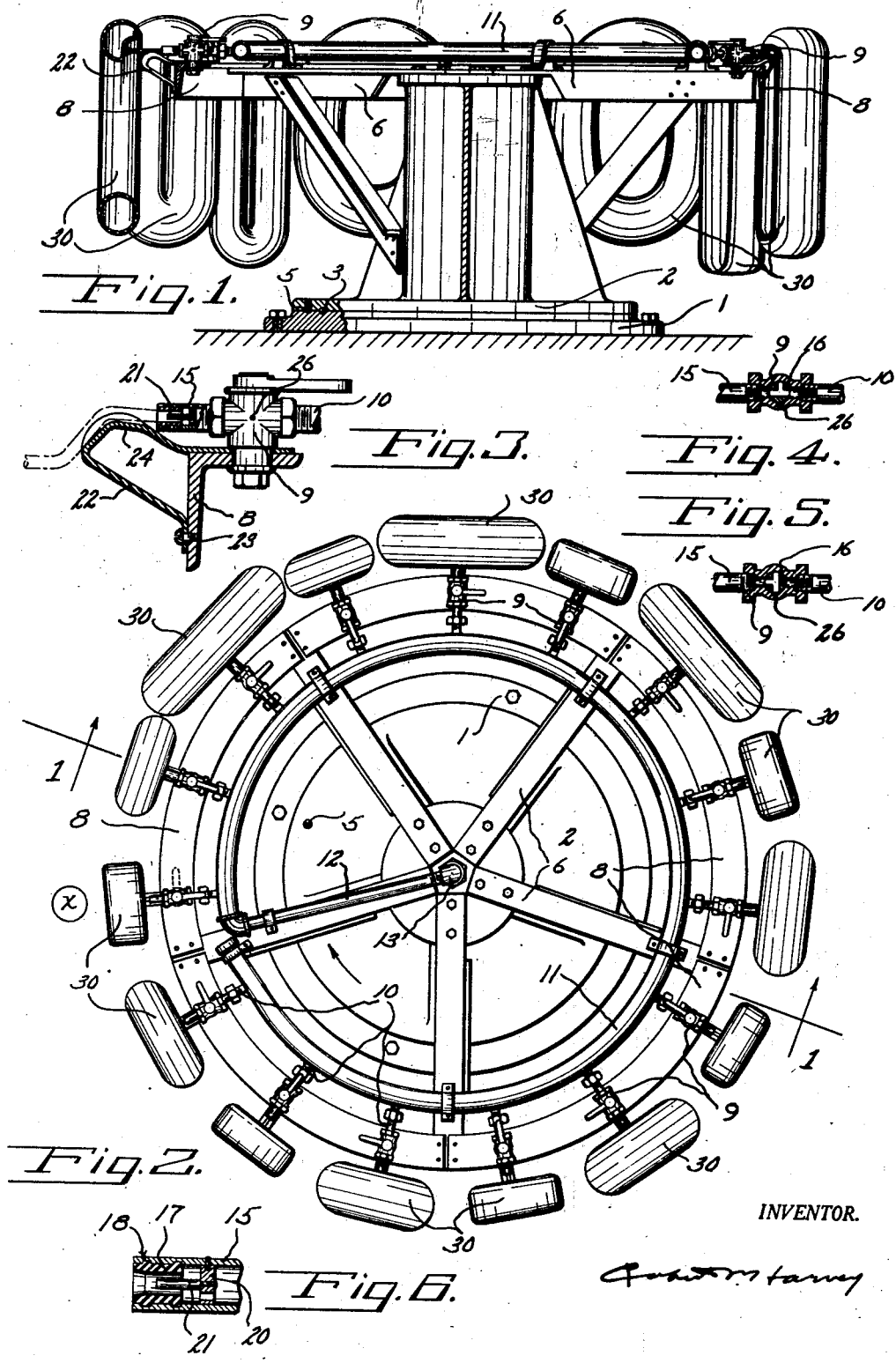
Fig. 1 is a sectional elevation substantially on line 1—1 of Fig. 2.
Fig. 2 is a plan view of the device.
Fig. 3 is a detail view, partly in section and on an enlarged scale, of one of the deflating heads.
Fig. 4 is a sectional detail of the control valve showing the parts in vacuum deflating position.
Fig. 5 is a similar view showing the valve in venting position.
Fig. 6 is a detail of the vacuum head.

Referring to the drawings, 1 designates a flat base upon which is rotatably mounted a turntable generally indicated at 2. Ball bearings 3 are provided between the base 1 and the turntable to facilitate the turning of the latter, and a yielding ball catch 5 is preferably inserted in the turntable 2 so as to engage in suitably spaced depressions in base 1 to assure the stopping of table in desired position. The upper part of the turntable comprises spokes 6 supporting at their outer ends arcuate sections 8 upon which are mounted a plurality of vacuum heads 9 connected by branch pipes 10 to a manifold 11 supported by spokes 6 and connected through a pipe 12 and a swivel coupling 13 to a vacuum line (not shown) forming the axis of the turntable. Each vacuum head comprises a valve stem receiving nozzle 15 connected by a two-way valve 16 to one of the branches 10. The free end of each nozzle 15 is provided with a sealing gasket 17 preferably formed of rubber and locked to the inner walls of nozzle 15 as by projections 18. The nozzle is also provided adjacent its end with a spider 20 carrying a valve opening pin 21. A valve stem support 22 is secured to the member 8, as at 23 (Fig. 3), immediately beneath the free end of each nozzle, this support having an inclined portion 24 to accommodate bent or angle valves as indicated in broken lines in Fig. 3.

At the start of the deflating operation, with no tubes on the device, the valves 16 will all be in the position shown in Fig. 5, that is, the vacuum is shut off and the nozzles 15 are vented through vents 26 in the valve casing. The operator may be positioned at any point about the periphery of the turntable as, for example, at $x$, to which point inflated inner tubes 30 may be brought by a conveyor. It will be understood that ball catch 5 releasably retains the turntable with one of the heads 9 opposite the operator. The operator crowds the valve stem of a tube 30 into the adjacent deflating nozzle, the pin 21 opening the valve in the stem and gasket 17 sealing the stem to the nozzle. The valve 16 is left in the position shown in Fig. 5 and the air in the tube begins its escape under its own pressure through vent 26. The operator then advances the turntable but skips the next head and positions a second tube in the third head in the same manner as in the first. The operator continues applying a tube to each alternate head until the first tube makes a complete circuit. During the time the first tube has made this first rotation a substantial amount of the enclosed air has escaped through vent 26. The operator now turns valve 16 to the position of Fig. 4 thus closing vent 26 and applying the vacuum. The operator then advances the turntable to the next head, which has been left vacant, and inserts the valve stem of a tube therein, in the manner first described. The turntable is now advanced one head at a time, the operator turning the valve on the occupied heads to vacuum position and merely placing a fresh tube on each adjacent vacant head. When the first head again returns to the operator the tube thereon is completely deflated and the device is completely loaded, alternate tubes being vented and under vacuum. The operator now turns the valve 16 of the first head to the position of Fig. 5, removes the deflated tube, inserts a fresh tube and without changing the setting of valve 16 advances the table. The next tube, it will be understood, has made but one rotation, its valve 16 being in venting position, and the operator merely changes the position of the valve 16 to apply the vacuum. The next tube is replaced in the same manner as the first and the operation is now continuous.

Having thus described my invention, I claim:

1. A deflating device which comprises a support movable in a closed path, a plurality of vacuum nozzles carried by the support and each adapted to be telescoped on the end of the valve stem of an article to be deflated, resilient gaskets carried by the nozzles and adapted to seal the valve stems in the nozzles, means in the nozzles to hold open the valve of the stems, means to supply vacuum to the nozzles and a two-way valve associated with each nozzle operable to alternately vent its nozzle to the atmosphere and connect it to the vacuum supply.

2. A deflating device which comprises an annular rotatable support, a plurality of vacuum nozzles carried by the support and each adapted to be telescoped over the end of the valve stem of an article to be deflated, resilient gaskets secured in the ends of the nozzles and adapted to seal the valve stems in the nozzles, means in the nozzles to hold open the valve of the stems, means carried by said rotatable support adjacent each nozzle and co-operating therewith to support a tube in deflating position, means to supply vacuum to the nozzles and a valve mechanism connecting each nozzle to the vacuum supply operable to alternately vent the head to the atmosphere and connect it to the vacuum supply.

3. A deflating head comprising a cylindrical nozzle member, a two-way valve connected to one end of the nozzle, a gasket formed of resilient material secured in the other end of the nozzle and adapted to tightly engage and seal the end of a valve stem in telescoping relation with the nozzle and a pin supported in the nozzle and positioned to engage and hold open the valve of the valve stem.

ROBERT P. HARVEY.